(12) United States Patent
Graefe et al.

(10) Patent No.: US 12,205,460 B2
(45) Date of Patent: Jan. 21, 2025

(54) PEDESTRIAN TRAFFIC MANAGEMENT

(71) Applicant: Intel Corporation, Santa Clara, CA (US)

(72) Inventors: Ralf Graefe, Haar (DE); Michael Paulitsch, Ottobrunn (DE); Norbert Stoeffler, Graefelfing (DE)

(73) Assignee: Intel Corporation, Santa Clara, CA (US)

( * ) Notice: Subject to any disclaimer, the term of this patent is extended or adjusted under 35 U.S.C. 154(b) by 879 days.

(21) Appl. No.: 17/131,900

(22) Filed: Dec. 23, 2020

(65) Prior Publication Data

US 2021/0110706 A1 Apr. 15, 2021

(51) Int. Cl.
*G08G 1/005* (2006.01)
*G01C 21/16* (2006.01)
*H04W 4/02* (2018.01)
*H04W 4/029* (2018.01)

(52) U.S. Cl.
CPC .............. *G08G 1/005* (2013.01); *G01C 21/16* (2013.01); *H04W 4/027* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 8,949,028 B1 * | 2/2015 | Klampfl | G01C 21/3423 |
| | | | 701/538 |
| 10,337,876 B2 * | 7/2019 | Salowitz | G01C 21/20 |
| 10,823,572 B2 * | 11/2020 | Huang | G06F 16/29 |
| 2011/0022304 A1 | 1/2011 | Lee | |
| 2011/0246062 A1 * | 10/2011 | Whitmyer, Jr. | G01C 21/3667 |
| | | | 701/533 |

FOREIGN PATENT DOCUMENTS

WO 2017144384 8/2017

OTHER PUBLICATIONS

"Netherlands Application Serial No. 2029880, Search Report mailed Apr. 11, 2023", W English Translation, 10 pgs.
"Dutch Application Serial No. 2029880, Response Filed Feb. 2, 2022 to Office Action mailed Dec. 16, 2021", w current English Translations, 18 pgs.

(Continued)

*Primary Examiner* — Adolf Dsouza
(74) *Attorney, Agent, or Firm* — Schwegman Lundberg & Woessner, P.A.

(57) ABSTRACT

A pedestrian route can be segmented into at least one pedestrian walking segment using location information of transportation resources. An estimated transit time for the pedestrian route can be determined as a function of an estimated transit time of the at least one pedestrian walking segment, an estimated wait time for the transportation resource to arrive at the user determined using received status real-time location and movement information of the transportation resource and the determined estimated transit time for the at least one pedestrian walking segment, and an estimated transit time for the transportation resource to transport the user.

25 Claims, 5 Drawing Sheets

(56) References Cited

OTHER PUBLICATIONS

Blunck, "PerPos: a platform providing cloud services for pervasive positioning", Conference: Proceedings of the 1st International Conference and Exhibition on Computing for Geospatial Research and Application, COM.Geo 2010, (Jun. 2010), 9 pgs.

Gartner, "Pedestrian Navigation System in Mixed Indoor Outdoor Environment—The NAVIO Project", (2004), 7 pgs.

Schougaard, "Indoor Pedestrian Navigation Based on Hybrid Route Planning and Location Modeling", Proceedings of the 10th international conference on Pervasive Computing 10.1007 978-3-642-31205-2_18., (2012), 19 pgs.

\* cited by examiner

PEDESTRIAN TRAFFIC MANAGEMENT

TECHNICAL FIELD

Embodiments described herein generally relate to transportation, and in particular, to pedestrian traffic management.

BACKGROUND

Conventional route planning solutions consider geolocation and traffic conditions in providing users with the fastest or shortest path to a desired location. The fastest or shortest path from an origin or user location to a desired location often involves a pedestrian walking segment, where a user is instructed to proceed on foot between transportation resources or to a transportation resource. Existing solutions predict pedestrian transit time as a measure of determined distance and a predefined average pedestrian walking speed. For example, one existing market solution calculates a pedestrian transit time of 1 minute for a distance of 130 meters based on an assumed pedestrian walking speed of 4.8 km/h. If the pedestrian segment connects to another method of transportation, the total route time is computed using the determined distance of the pedestrian segment and the predefined average pedestrian walking speed and the next scheduled departure time of the other method of transportation.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
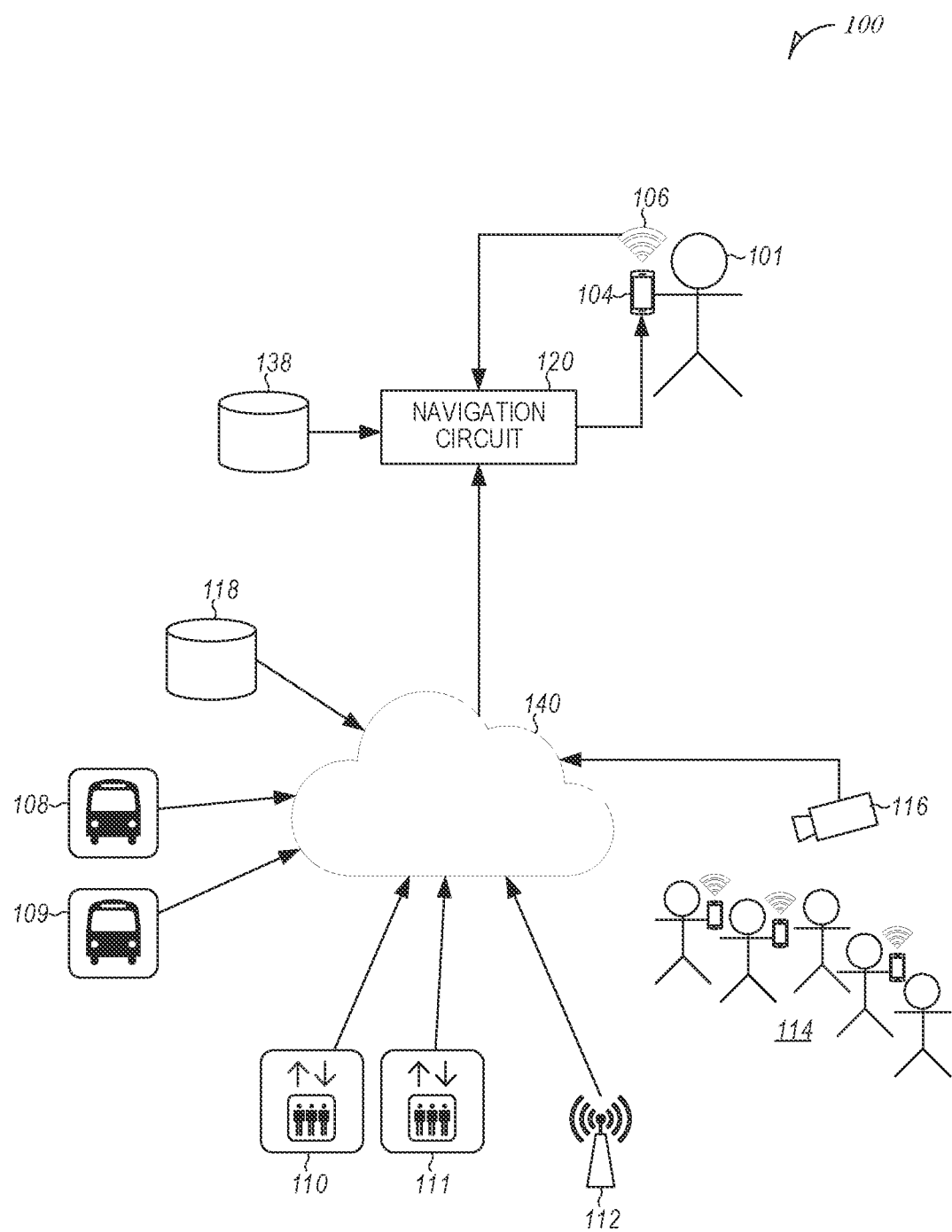
FIG. 1 illustrates an example multimodal mobility system.

In the following description, for purposes of explanation, numerous specific details are set forth in order to provide a thorough understanding of some example embodiments. It will be evident, however, to one skilled in the art that the present disclosure may be practiced without these specific details.

The present inventors have recognized a number of disadvantages to conventional route planning solutions including a pedestrian segment. For example, conventional route planning solutions typically do not account for: the actual walking speed of a user; delays by pedestrian congestion, queues, etc.; actual wait times for transportation resources (e.g., elevators, escalators, moving walkways, shuttles, crossing lights, etc.), such as given current system resources or congestion; pedestrian wait times for traffic lights; waiting time for connecting transportation (e.g., schedule confidence, current connecting transportation location, etc.); actual start time estimate (e.g., departing now, departing in five minutes, etc.), etc.

To overcome such limitations, the present inventors have recognized systems and methods to aggregate and incorporate real-time transportation resource information and to incorporate such information into route planning and guidance for the user, such as to provide indoor pedestrian traffic management through a building or property, or other pedestrian traffic management with respect to a transportation resource.

Multimodal mobility solutions, such as through browser-based or mobile applications (e.g., Moovit, etc.), require accurate prediction of pedestrian transit time to distinguish between different mobility combinations and routes and to provide optimal route guidance to a desired location. Predicted pedestrian transit time error or excessive variation may lead to missed connections, possibly adding considerable overall transit delay, or reduce user satisfaction with the solution. Simple pedestrian segments, such as simple routes on known thoroughfares, can be based on rough averages. However, time spent walking in or through buildings or waiting for or using transportation resources (e.g., elevators, escalators, moving walkways, shuttles, crossing lights, etc.) are often not taken into consideration. In addition, walking times inside or through interior spaces (e.g., the time to reach a certain conference room, or travel to or from a specific point in the building, etc.) may add to overall transit times or estimates, and accordingly may vary or change route options.

In other examples, user information can be determined or stored, such as average walking speed for a specific user, transportation or navigation experience, such as with respect to past user performance or with respect to average community, population, or demographic movement, etc. For example, the solutions described herein can track whether or not the user is typically faster or slower than the original predicted transit time. Such tracking can be used to increase route planning accuracy. Further, accurate starting positions or coordinates can make a significant difference in improving predicted and estimated transit times. Accordingly, the mobility solution may learn certain information, such as an average time between segments, whether or not the user typically starts route guidance several minutes prior to actually departing their physical location (e.g., packing a bag, cleaning a workspace, putting a child in a car seat, etc.), etc., and incorporate such to improve route planning and to more accurately represent predict pedestrian transit time.

Modern buildings and infrastructure collect and aggregate transportation resource information. Certain aspects of such modern buildings and infrastructure, such as signage, elevators, escalators, moving walkways, cameras, heating and cooling systems, power control, traffic lights, etc., can be controlled or optimized, such as using the collected and aggregated transportation resource information.

For example, multimodal mobility solution accuracy can be improved using transportation resource information. Pedestrian transit time can be predicted, such as to determine wait times for connecting transportation, using user location information, user walking speed (e.g., a current walking speed, average walking speed specific to the user for all segments, for this segment, or for similar or related segments, etc.), and a current status of transportation resources, such as building transportation resources including elevators, escalators, security doors, pathway information, etc., or other transportation resources, such as traffic lights, etc. More accurate transportation resource information can reduce a buffer time with respect to a determined route. Buffer time can refer to mobility buffer time added by the mobility solution to decrease the likelihood that the user will miss connecting transportation, or to personal buffer time added by the user to ensure reliable connections or to reduce travel stress.

In an example, transit times of multiple users, or aggregate transit times of users associated with a specific building or transportation resource, such as associated with a property, an event, etc., can be optimized by actively managing pedestrian traffic through the building or transportation resources, reducing overall traffic times for a majority of users, sometimes at the expense of an individual user having more buffer time associated with their ensuing connection. The multimodal mobility solution, such as the route planning or guidance, can be provided to the user through a mobile device, such as through a map-based application on a smart phone, watch, glasses, earpiece, etc., or through one or more other solutions (e.g., augmented reality devices, etc.).

FIG. 1 illustrates an example multimodal mobility system 100 including a user 101 and a navigation circuit 120 coupled to or a portion of a mobile device 104 of the user 101. The navigation circuit 120 can include one or more processing circuits configured to aggregate transportation resource information, such as information from one or more building transportation resources (e.g., elevators, escalators, moving walkways, etc.), to determine and distinguish between possible routes, including pedestrian segments, and to predict a transit time, including a pedestrian transit time, using the transportation resource information. In certain examples, the possible routes, segments, and transit times can be determined using stored or received user information.

In other examples, the navigation circuit 120 can receive real-time information from or about the user 101 or one or more other users 114 proximate to or along one or more of the possible pedestrian segments, such as using one or more transportation resource sensors, such as a camera 116, a number of devices moving through an area (e.g., a building, etc.), such as using a wireless data network connection 106 or other connection (e.g., a cellular connection, a Bluetooth connection, radio frequency identification (RFID), etc.) of the mobile device 104 or one or more devices of the one or more other users 114, etc.

The navigation circuit 120 can be coupled to a database 138 of stored navigation, user, or transportation resource management information, including typical or predicted usage patterns, or coupled to a database 118 through a network 140. The network 140 can receive information from transportation resources, such as first and second busses 108, 109, first and second elevators 110, 111, or one or more other transportation or building transportation resources. Transportation resources can include any system or device configured to assist in the movement or transit of one or more users between locations, and is a broader category than building transportation resources, which in contrast, refers to systems or devices inside of or associated with a building or property configured to assist in the movement or transit of one or more users within or into or out of the building or property. Transportation resources, as described above, can include crossing lights, busses, trains, vehicles, etc. Building transportation resources are a narrower subset of resources, including elevators, escalators, moving walkways, locked doorways, entrances, exits, and other resources associated with a specific buildings or properties, including multi-story infrastructure, multi-level transit infrastructure (e.g., transit stations, parking garages, airports, etc.).

The network 140 can further be coupled to one or more other devices, such as via a communication connection 112. The one or more other devices can include internet-of-things or edge devices configured to interact with or otherwise receive information from the one or more users, such as stop lights, crosswalks, etc. The network 140 can further be configured to receive information from one or more other users 114, such as through network-connected (e.g., wireless data network, etc.) devices, or detected by one or more sensors, such as a camera 116, etc.

The multimodal mobility system 100 can estimate the position and speed of the user 101 using one or more sensors or sensor information, including global positioning system (GPS), Wi-Fi, inertial information, etc. The navigation circuit 120 can constantly receive position and speed information to update routing and transit time estimates. While moving in uncrowded areas, the speed of the user 101 can be used to determine, updated, or improve an average walking speed for the user 101. The average walking speed of the user 101 can be used to accurately determine a predicted transit time through an open or uncrowded area. For crowded or congested areas, the average walking speed of the user 101 can be replaced by a determined average walking speed of people in the area, or reduced by a slow-down factor (e.g., reduced by a percentage based on the average walking speed of people in the area, etc.), if the determined average walking speed of people in the area is lower than the average walking speed of the user 101.

The navigation circuit 120 can be configured to measure a density of a crowd along or proximate a transit route, for example, using user data of this or other multimodal mobility systems, or density information from one or more sensors or resources associated with the multimodal mobility system 100, such as the camera 116, the load on a communication connection 112 (e.g., a wireless data network tower or base station, etc.), etc.

The multimodal mobility system 100 can publish obfuscated location and speed information for the user 101 or the one or more other users 114 to the network 140, to the database 118, or to the database 138. In an example, to obfuscate user data, specific speed information for a user might not be published, but a slow-down factor representative of a difference between a known user average speed and a current user speed. In other examples, the number of mobile devices connected to a certain wireless data network base station can be used to determine indications of congestion.

The navigation circuit 120 can use such information to determine indications of congestion for various transit routes. The determined indications of congestion can be used to determine or adjust predicted transit times along the different routes. In an example, if congestion is detected along a specific route, predicted transit times along that specific route can be adjusted to account for such congestion (e.g., weighted according to the determined congestion or average walking speed along the route, etc.). In other examples, if determined indications of congestion along multiple routes show similar congestion or average walking speeds (e.g., within a specific percentage of each other), the navigation circuit 120 can assume that routes without specific speed information can be similarly congested, and can determine or adjust predicted transit times along all routes using the assumed congestion information until indications otherwise are received, such as using information from a user traveling the specific route, or information from one or more other sensors, etc.

Figure 2:
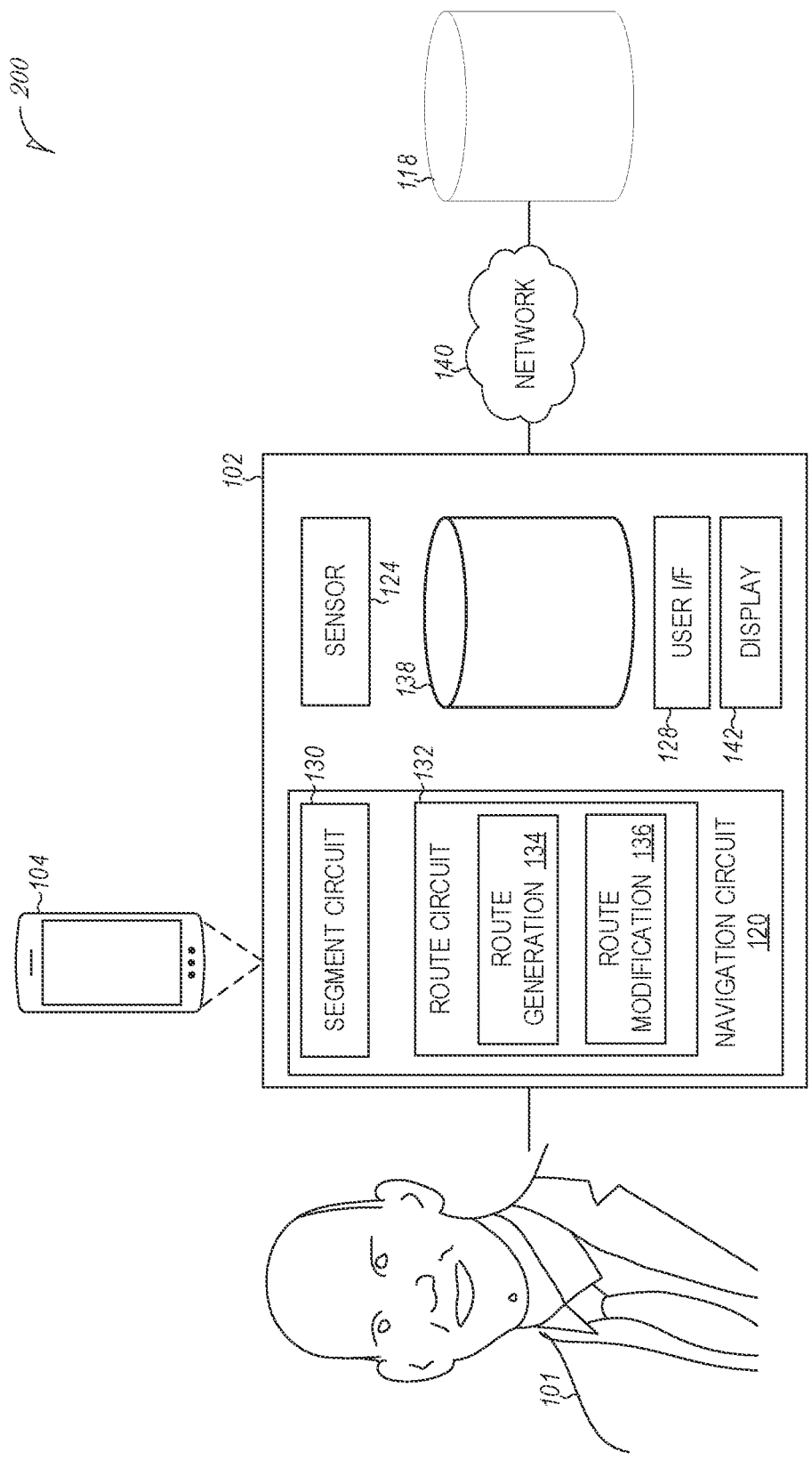
FIG. 2 illustrates an example processing platform.

FIG. 2 illustrates an example processing platform 102, such as of a mobile device 104 of a user 101, the processing platform 102 including a navigation circuit 120 and associated components and subcomponents, including a user interface 128 configured to receive information from the user 101, a segment circuit 130 configured to, among other things, segment a pedestrian route into different segments, a route circuit 132 comprising a route generation circuit 134 and a route modification circuit 136, and a display 142 configured to provide information to the user 101.

In an example, the processing platform 102 can determine an average speed of the user 101 or otherwise receive inertial or accelerometer information, such as from a sensor 124, etc. Information about navigation, routes, the user 101, etc., can be stored in a database 138. Information, such as routing information or options can be provided to the user 101 using a display 142 or one or more other user interfaces (e.g., audio, etc.). The processing platform 102 can further be coupled to a database 118 external to the processing platform 102 or the mobile device 104, such as through a network 140. In other examples, the processing platform 102 can determine congestion or movement information (e.g., location, speed, direction, etc.) associated with the user 101, the mobile device 104, or one or more other devices coupled thereto, and provide such information to the database 118 through the network 140, such as for use by one or more other users, devices, navigation systems, etc.

Figure 3:
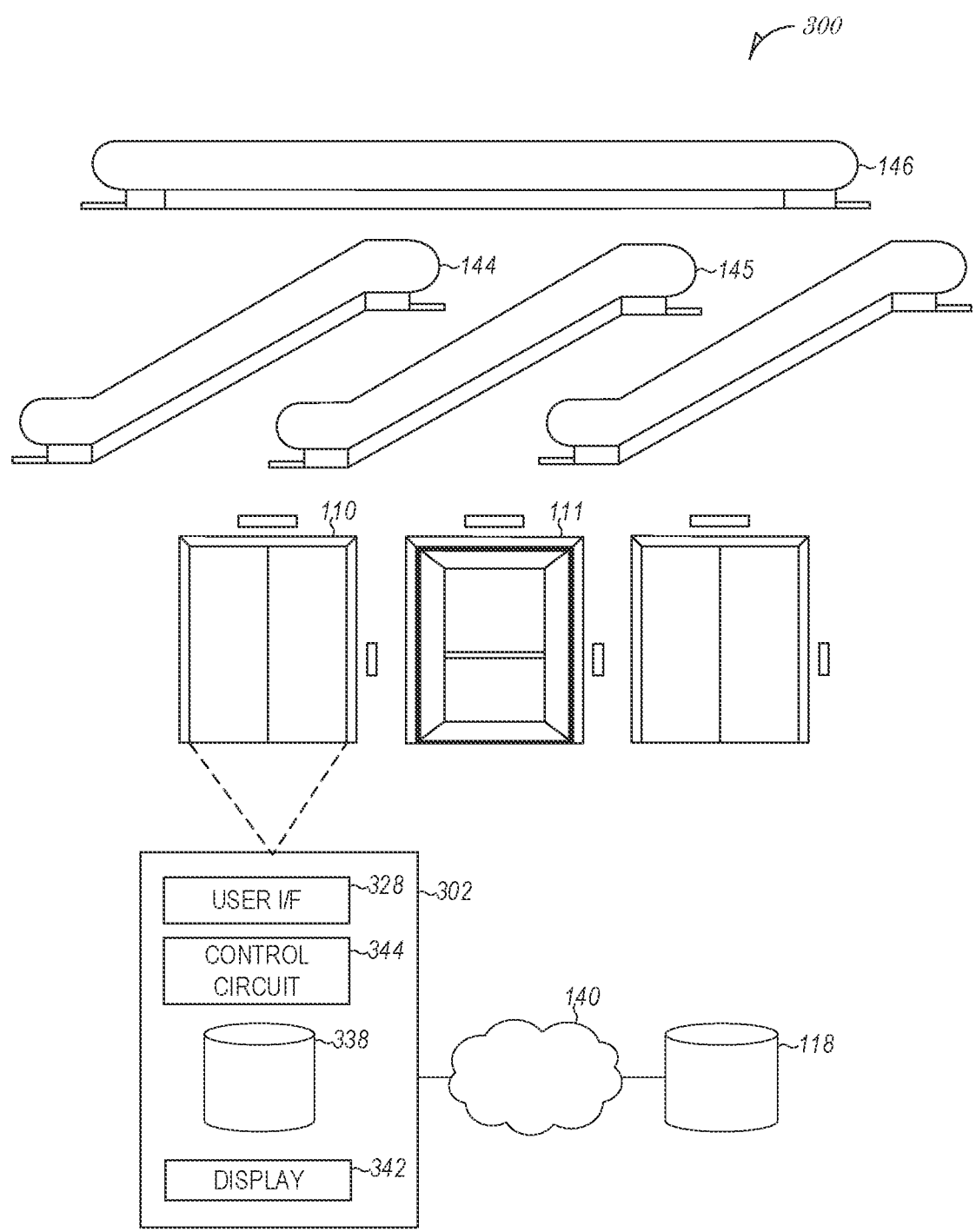
FIG. 3 illustrates an example system of building transportation resources.

FIG. 3 illustrates an example system 300 of building transportation resources including first and second elevators 110, 111 of a group of elevators, first and second escalators 144, 145 of a group of escalators, and a moving walkway 146, such as of a group of moving walkways. The first elevator 110 can include a processing platform 302 configured to control the first elevator 110, to receive commands, such as through a network 140, or to provide information to a database 118, etc. The processing platform 302 can include a user interface 328 to receive information from a user, a control circuit 344 to provide one or more controls to the building transportation resource, a database 338 to store information, and a display 342 to provide information to a user. Although illustrated in connection to the first elevator 110, each building transportation resource can include a respective processing platform 302.

One or more of the building transportation resources can connect to the network 140, such as a network internal to a building or property containing it, or beyond, such as to a central processing system, or to the cloud for distributed cooperation with one or more other services, such as to aspects of the multimodal mobility system 100 of FIG. 1. In an example, static building information can be stored and provided, including geometric shapes of buildings or floors, elevator locations and associated floors and connections, etc. In addition, building transportation resources can publish their state in real-time. For example, the processing platform 302 of the first elevator 110 can publish a status including an indication that the first elevator 110 is in service, or movement information, including a current floor, speed, direction, received user commands, etc. Similarly, processing platforms of escalators, moving walkways, indoor shuttles, etc., can publish statuses including whether or not the resource is in service, and movement information comprising a current direction, speed, and load, etc. Displays of such resources can illustrate a current direction, intention to change directions given changing determined pedestrian traffic flow, etc.

In a similar manner, connecting transportation can publish their status in real-time, and such information can be used in making determinations for the building transportation resources. In advanced planning scenario, routes of the users can be backpropagated to building transportation resources. Building transportation resources can be controlled to adapt to actual or predicted changes in pedestrian congestion. For example, the direction of escalators or the position of elevators can be controlled in preparation for arrival of multiple trains to a transit station, such as to immediately move users through a space. Signage can be controlled to redirect a user.

The control of an elevator, for example, can integrate information on soon arriving users into its schedule planning. While users are still far away, and the exact arrival is not known yet, only expected the traffic density is used for a global optimization of elevator schedules. When the user comes closer and its arrival time is known precisely enough, the individual user can be treated as if they had already pressed the elevator button or requested the elevator. In the best case, an elevator door automatically opens when the user arrives, reducing wait time (e.g., close to zero).

Other building transportation resources can be controlled, similarly. For example, an ensemble of escalators or moving walkways can adapt their direction according to the expected traffic density, unused indoor shuttles can autonomously gather at the places where the highest demand is expected, etc.

In other examples, building transportation resources can prioritize a transit path for users having an ensuing connection closer in time than other users. Priority can be increase or decrease for specific users depending on the total or relative impact of missing the ensuing connection to the overall transit time of the user. In an example, elevators may prioritize pickup or drop-off of specific floors associated with such users having ensuing connections, in certain examples, prioritizing the request of one user or a group of users over others. Other information can impact prioritization, such as mobility challenges (e.g., temporary or permanent physical disability, pregnancy, traveling with children, etc.).

In other examples, a mobile device of a user can direct a user through a space, given profile selections or preferences of the user, such as if the user has input a preference for stairs over escalators and elevators when traversing a certain number of floors, etc. If a user has more time before an ensuing connection, such information can be presented to the user, such as with a color or an icon, so the user can relax in transport. In other examples, the user can be prompted to hurry, or to avoid elevators or escalators, such as if the stairs are faster and the time before the ensuing connection is smaller.

Although described in FIG. 3 with respect to building transportation resources, in other examples, management or control of other transportation resources, such as traffic lights, are similarly contemplated.

Figure 4:
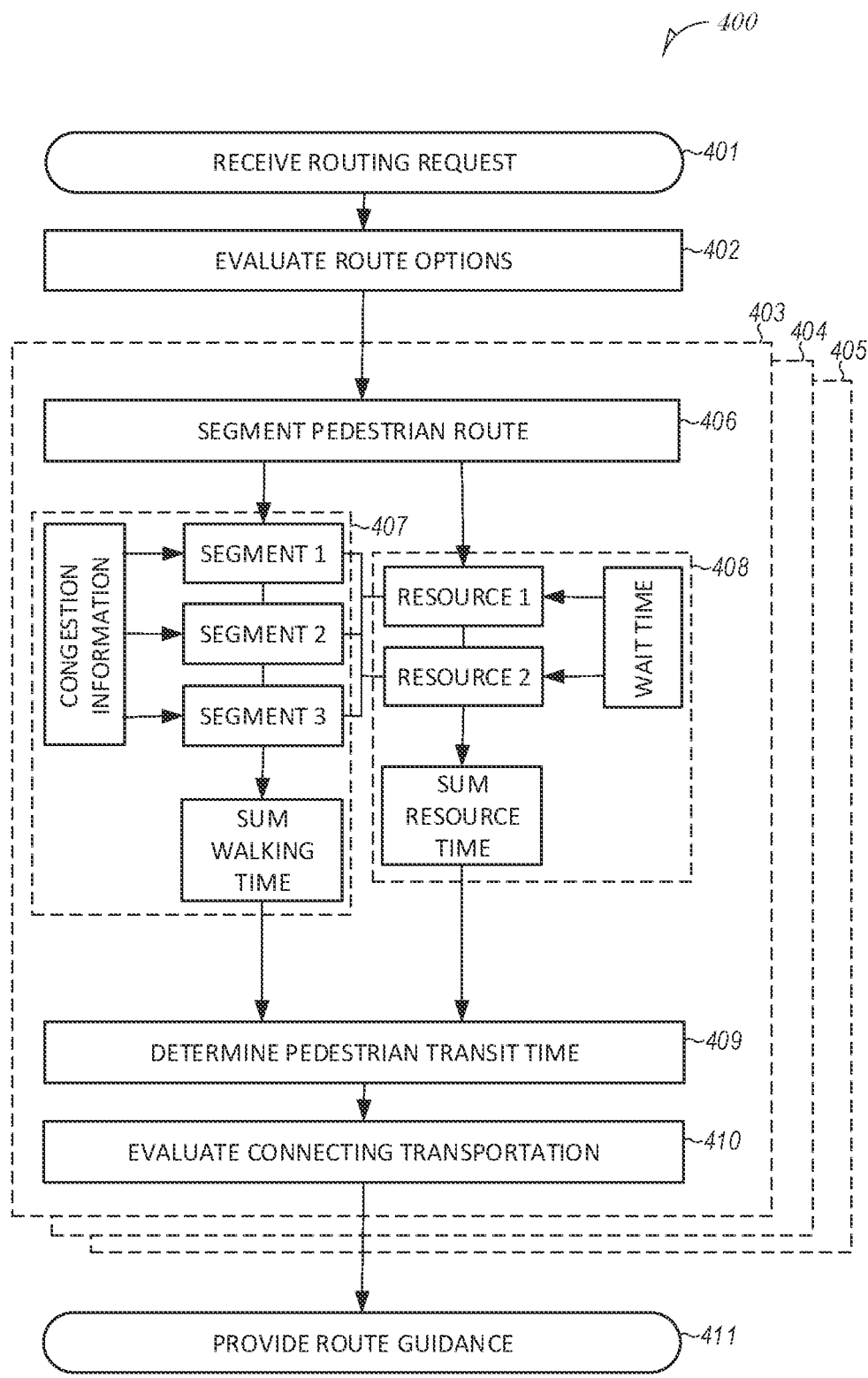
FIG. 4 illustrates an example method of incorporating transportation resource information into route planning and guidance for a user.

FIG. 4 illustrates an example method 400 of incorporating transportation resource information into route planning and guidance for a user. At 401, a routing request can be received from a user, such as through a multimodal mobility solution. At 402, route options are evaluated, such as components of a multimodal mobility solution. Many route planning solutions begin with or include pedestrian segments. To determine a specific route, or to provide an estimated transit time of a specific route or pedestrian segments, multiple routing options are often evaluated, such as first, second, and third pedestrian routes 403, 404, 405, etc. Although described herein with respect to the first pedestrian route 403, similar methods or determinations can be evaluated with respect to additional possible pedestrian routes, such as the second and third pedestrian routes 404, 405. In an example, the multiple routing options can include a number (N) of shortest distance paths.

At 406, the first pedestrian route can be separated into different pedestrian walking segments, for example, based on crowd density, expected or average transit speed, or on either side of a transportation or building transportation resources. Pedestrian walking segments can be evaluated at 407 and, at 408, transportation or building transportation resources segments can be evaluated, separate from or in combination with the pedestrian walking segments.

For example, a specific pedestrian segment can include a number of pedestrian walking segments (e.g., segments 1-3 in FIG. 4) separated by a number of transportation resources (e.g., resources 1-2 in FIG. 4). In an example, segment 1 can include a walk from an office to resource 1, such as an elevator. Segment 2 can include a walk from the elevator to resource 2, such as an escalator. Segment 3 can include a walk through a lobby of a building to an exterior door of the building. In certain examples, the exterior door can be included as another resource. Additional pedestrian segments can occur outside of the building, such as a walking segment from the exterior building door to a transit platform, etc. Average transit times for each of these segments can be determined using a distance of the segment and an average speed of the user or a group of users.

For each segment, the multimodal mobility solution can receive congestion information indicative of crowd density. As described above, density information can be determined using the number of detected devices detected along the segment, using information from a user, or using sensor data, such as a camera, etc. Congestion information can be used to determine a slowdown factor for each segment. In an example, the average speed of the user can be adjusted (e.g., reduced) by the slowdown factor. In an example, the slowdown factor can be between 0 and 10, reducing the average speed of the user by a function of the slowdown factor (e.g., multiplying the average speed of the user by (1−(slowdown factor/10)), etc.) or a function of the of the slowdown factor and the average speed of a group of users (e.g., multiplying the average speed of the user with respect to a group of users by (1−(slowdown factor/10)), etc.). The predicted times can be adjusted accordingly. The estimated walking time of each walking segment can be summed.

Similarly, the mobility solution can adjust resource wait time using the received congestion information, and additionally, using information regarding the published status of the transportation resources, such as an estimated arrival time of the resource, given the estimated walking time of the one or more preceding segments. The waiting times and time associated with the resource can be summed. If an arrival or wait time for a specific transportation resource cannot be determined or predicted with sufficient accuracy, the estimated time can be replaced by an average time or a worst-case estimate. Additionally, the determined estimates can be adjusted or refined as the user approaches the transportation resource.

At 409, the pedestrian transit time for the segment can be determined using the determined walking and resource times. At 410, connecting transportation options can be evaluated depending on the determined pedestrian transit times. At 411, after consideration of the multiple routing options (e.g., first, second, and third pedestrian routes 403, 404, 405, etc.), the determined route can be provided at 411.

For example, the path with the shortest overall pedestrian transit time can be selected and provided to the user, such as using a mobile device, on a map, or through a display, such as by overlaying the transit directions as an augmented reality real-world view. The optimal path can be updated along the route if congestion or wait time information of one or more of the segments or transportation resources changes.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 5:
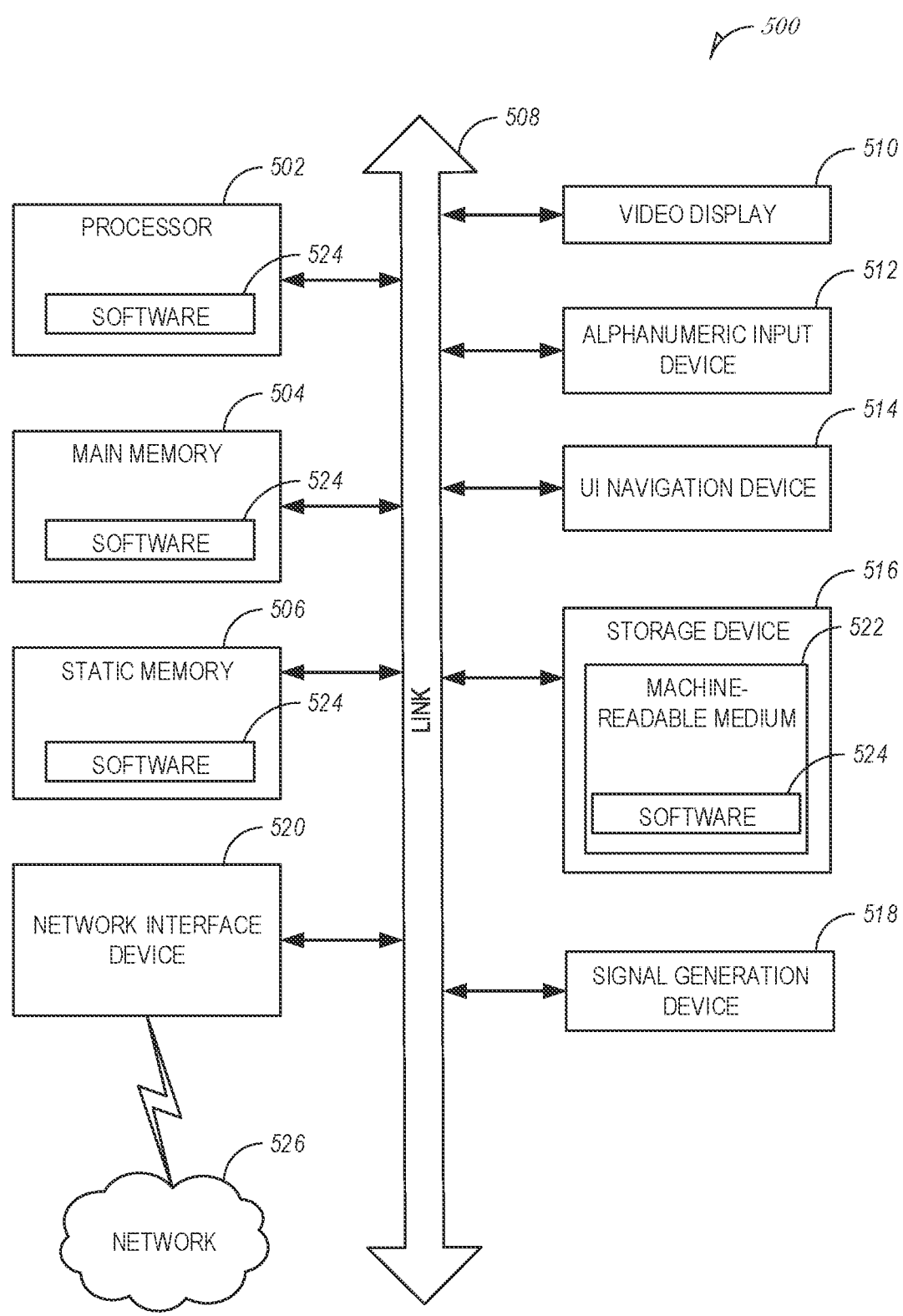
FIG. 5 illustrates an example machine in the form of a computer system within which a set or sequence of instructions may be executed to cause the machine to perform any one of the methodologies discussed herein.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 5 illustrates an example machine in the form of a computer system 500 within which a set or sequence of instructions may be executed to cause the machine to perform any one of the methodologies discussed herein. In alternative embodiments, the machine operates as a stand-alone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, gyrometer, magnetometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, LoRa/LoRaWAN, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

Example 1 is a pedestrian traffic management system, comprising: a navigation circuit configured to determine an estimated transit time for a pedestrian route for a user between an origin and a destination; and a segment circuit configured to receive location information of a first transportation resource with respect to the pedestrian route and status information of the first transportation resource, and to segment the pedestrian route into at least one pedestrian walking segment comprising a first pedestrian walking segment preceding the first transportation resource using the location information of the first transportation resource, wherein to determine the estimated transit time for the pedestrian route, the navigation circuit is configured to determine an estimated transit time for a first pedestrian walking segment and to determine an estimated wait time for the first transportation resource using the received status information of the first transportation resource and the determined estimated transit time for the first pedestrian walking segment.

In Example 2, the subject matter of Example 1 includes, wherein the navigation circuit is configured to receive movement information of the user, wherein to determine the estimated transit time for the first pedestrian walking segment comprises using the received movement information of the user, and wherein the pedestrian traffic management system comprises a user interface configured to provide an indication of the determined estimated wait time to the user.

In Example 3, the subject matter of Example 2 includes, wherein the status information of the first transportation resource comprises movement information of the first transportation resource, and wherein to determine the estimated wait time for the transportation resources comprises using the received movement information of the first transportation resource and the determined estimated transit time for the first pedestrian walking path.

In Example 4, the subject matter of Example 3 includes, wherein the movement information of the user comprises a location and speed of the user and the movement information of the first transportation resource comprises a location, direction, and speed of the first transportation resource.

In Example 5, the subject matter of Examples 2-4 includes, wherein the navigation circuit is configured to provide route guidance information to the user of the pedestrian route, the route guidance comprising an indication of the determined estimated wait time.

In Example 6, the subject matter of Examples 1-5 includes, a control circuit configured to provide an instruction to control the first transportation resource using the determined estimated transit time for the first pedestrian walking segment.

In Example 7, the subject matter of Examples 1-6 includes, wherein to segment the pedestrian route comprises to segment the pedestrian route into the at least one pedestrian walking segment and a first transportation resource segment, wherein the pedestrian route comprises the at least one pedestrian walking segment and the first transportation resource segment, wherein the navigation circuit is configured to determine an estimated transit time of the first transportation resource segment, and wherein the estimated transit time for the pedestrian route comprises the determined estimated transit time for the first pedestrian walking segment, the determined estimated wait time for the first transportation resource, and the determined estimated transit time of the first transportation resource segment.

In Example 8, the subject matter of Examples 1-7 includes, wherein the first transportation resource comprises a building transportation resource, wherein the building transportation resource comprises an elevator. In another example, the building transportation resource comprises an escalator.

In Example 9, the subject matter of Examples 1-8 includes, wherein the navigation circuit is configured to receive average pedestrian transit information about the at least one pedestrian walking segment, and to determine an indication of congestion for the at least one pedestrian walking segment using the received average pedestrian transit information.

In Example 10, the subject matter of Example 9 includes, wherein the navigation circuit is configured to receive movement information of the user and to determine the indication of congestion for the at least one pedestrian walking segment using the received average pedestrian transit information and the received movement information of the user.

In Example 11, the subject matter of Example 10 includes, wherein the received average pedestrian transit information comprises an average walking speed of a plurality of users for the at least one pedestrian walking segment, and wherein the movement information of the user comprises a speed of the user.

Example 12 is a pedestrian traffic management method, comprising: determining, using a navigation circuit, an estimated transit time for a pedestrian route for a user between an origin and a destination; and receiving location information of a first transportation resource with respect to the pedestrian route and status information of the first transportation resource; and segmenting, using a segment circuit, the pedestrian route into at least one pedestrian walking segment comprising a first pedestrian walking segment preceding the first transportation resource using the location information of the first transportation resource, wherein determining the estimated transit time comprises: determining an estimated transit time for a first pedestrian walking segment; and determining an estimated wait time for the first transportation resource using the received status information of the first transportation resource and the determined estimated transit time for the first pedestrian walking segment.

In Example 13, the subject matter of Example 12 includes, receiving movement information of the user, wherein determining the estimated transit time for the first pedestrian walking segment comprises using the received movement information of the user, and wherein the method comprises providing, using a user interface, an indication of the determined estimated wait time to the user.

In Example 14, the subject matter of Example 13 includes, wherein the status information of the first transportation resource comprises movement information of the first transportation resource, and wherein determining the estimated wait time for the transportation resources comprises using the received movement information of the first transportation resource and the determined estimated transit time for the first pedestrian walking path.

In Example 15, the subject matter of Example 14 includes, wherein the movement information of the user comprises a location and speed of the user and the movement information of the first transportation resource comprises a location, direction, and speed of the first transportation resource.

In Example 16, the subject matter of Examples 13-15 includes, providing route guidance information to the user of the pedestrian route, the route guidance comprising an indication of the determined estimated wait time.

In Example 17, the subject matter of Examples 12-16 includes, controlling the first transportation resource using the determined estimated transit time for the first pedestrian walking segment.

In Example 18, the subject matter of Examples 12-17 includes, wherein segmenting the pedestrian route comprises segmenting the pedestrian route into the at least one pedestrian walking segment and a first transportation resource segment, wherein the pedestrian route comprises the at least one pedestrian walking segment and the first transportation resource segment, wherein the method comprises determining an estimated transit time of the first transportation resource segment, and wherein determining the estimated transit time for the pedestrian route comprises: determining the estimated transit time for the first pedestrian walking segment; determining the estimated wait time for the first transportation resource; and determining the estimated transit time of the first transportation resource segment.

In Example 19, the subject matter of Examples 12-18 includes, wherein the first transportation resource comprises a building transportation resource, wherein the building transportation resource comprises an elevator.

In Example 20, the subject matter of Examples 12-19 includes, receiving average pedestrian transit information about the at least one pedestrian walking segment, and determining an indication of congestion for the at least one pedestrian walking segment using the received average pedestrian transit information.

In Example 21, the subject matter of Example 20 includes, receiving movement information of the user; determining the indication of congestion for the at least one pedestrian walking segment using the received average pedestrian transit information and the received movement information of the user.

In Example 22, the subject matter of Example 21 includes, wherein the received average pedestrian transit information comprises an average walking speed of a plurality of users for the at least one pedestrian walking segment, and wherein the movement information of the user comprises a speed of the user.

Example 23 is at least one machine-readable medium including instructions for pedestrian traffic management, the instructions, when executed by a machine, cause the machine to perform operations comprising: determining an estimated transit time for a pedestrian route for a user between an origin and a destination; and receiving location information of a first transportation resource with respect to the pedestrian route and status information of the first transportation resource; and segmenting the pedestrian route into at least one pedestrian walking segment comprising a first pedestrian walking segment preceding the first transportation resource using the location information of the first transportation resource, wherein determining the estimated transit time comprises: determining an estimated transit time for a first pedestrian walking segment; and determining an estimated wait time for the first transportation resource using the received status information of the first transportation resource and the determined estimated transit time for the first pedestrian walking segment.

In Example 24, the subject matter of Example 23 includes, the operations comprising: receiving movement information of the user, wherein determining the estimated transit time for the first pedestrian walking segment comprises using the received movement information of the user, and wherein the method comprises providing, using a user interface, an indication of the determined estimated wait time to the user.

In Example 25, the subject matter of Example 24 includes, wherein the status information of the first transportation resource comprises movement information of the first transportation resource, and wherein determining the estimated wait time for the transportation resources comprises using the received movement information of the first transportation resource and the determined estimated transit time for the first pedestrian walking path.

Example 25 is a system comprising: means for receiving a user request for a multi-user transit plan to route first and second users to a common meeting point from different starting locations; means for receiving location information of the first and second users; means for determining candidate travel paths for the first and second users using the location information of the respective user and the common meeting point; means for identifying a merge opportunity in the candidate travel paths to coordinate shared travel between the first and second users; means for determining adjusted travel paths and a cost of the adjusted travel paths for the first and second users using the identified merge opportunity from the candidate travel paths; and means for communicating the adjusted travel paths to the first and second users.

In Example 26, the subject matter of Example 25 includes, means for determining estimated travel times of the candidate travel paths for the first and second users; and means for determining estimated travel times of the adjusted travel paths for the first and second users, wherein means for determining the cost of the adjusted travel paths with respect to the candidate travel paths comprises means for determining a difference between the estimated travel times of the candidate travel paths and the estimated travel times of the adjusted travel paths.

In Example 27, the subject matter of Example 26 includes, wherein means for determining the difference between the estimated travel times of the candidate travel paths and the estimated travel times of the adjusted travel paths comprises means for subtracting the estimated travel times of the candidate travel paths from the estimated travel times of the adjusted travel paths to determine an aggregate time cost, and wherein the system includes means for determining the multi-user transit plan using the aggregate time cost.

In Example 28, the subject matter of Examples 25-27 includes, means for providing the cost of the adjusted travel paths with respect to the candidate travel paths to at least one of the first or second users; and means for receiving, in response to the provided cost, a selection of the candidate travel paths or the adjusted travel paths.

In Example 29, the subject matter of Examples 25-28 includes, means for determining an estimated shared travel time for the first and second users of the adjusted travel paths between the merge opportunity and the common meeting point; and means for determining the multi-user transit plan as the adjusted travel paths if the cost of the adjusted travel paths is less than the estimated shared travel time for the first and second users of the adjusted travel paths, wherein the cost of the adjusted travel paths is a measure of time.

In Example 30, the subject matter of Examples 25-29 includes, means for receiving user travel preferences of the first and second users; and means for determining candidate travel paths for the first and second users using the location information for the respective user, the common meeting point, and the user travel preferences, wherein the candidate travel paths comprise combinations of different travel modalities, the travel modalities comprising at least one mobility-as-a-service (MaaS) or public transit vehicle, wherein the user request comprises a request for the multi-user transit plan from the first user, the request for the multi-user transit comprising at least one of a proposed time of departure for at least one of the first or second users of the multi-user transit plan or a proposed time of meeting at the common meeting point, and wherein means for determining the candidate travel paths comprises means for determining optimal candidate travel paths for the first and second users based on the received user travel preferences.

In Example 31, the subject matter of Examples 25-30 includes, means for determining indications of wellbeing for the candidate travel paths and the adjusted travel paths for the first and second users; means for determining indications of environmental impact for the candidate travel paths and the adjusted travel paths for the first and second users; and means for providing the indications of wellbeing and environmental impact for the candidate travel paths and the adjusted travel paths for the first and second users to one of the first and second users; and means for receiving, in response to the provided indications of wellbeing and environmental impact, a selection of the candidate travel paths or the adjusted travel paths.

Example 32 is at least one machine-readable medium including instructions that, when executed by processing circuitry, cause the processing circuitry to perform operations to implement of any of Examples 1-31.

Example 33 is an apparatus comprising means to implement of any of Examples 1-31.

Example 34 is a system to implement of any of Examples 1-31.

Example 35 is a method to implement of any of Examples 1-31.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A" and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system, comprising:
    a navigation circuit configured to determine an estimated transit time for a pedestrian route for a user; and
    a segment circuit configured to receive location information of a transportation resource with respect to the pedestrian route and to segment the pedestrian route into at least one pedestrian walking segment that precedes the transportation resource in the route using the location information,
    wherein the navigation circuit is configured to receive information about the user and real-time location and movement information of the transportation resource and to determine:
        an estimated transit time for the at least one pedestrian walking segment based on the information about the user and the at least one segmented pedestrian walking segment of the pedestrian route;
        an estimated wait time for the transportation resource to arrive at the user using the received real-time location and movement information of the transportation resource and the determined estimated transit time for the at least one pedestrian walking segment; and
        an estimated transit time for the transportation resource to transport the user, and
    wherein the navigation circuit is configured to determine the estimated transit time for the pedestrian route as a function of the determined estimated transit time for the at least one pedestrian walking segment, the determined estimated wait time for the transportation resource, and the determined estimated transit time for the transportation resource.

2. The system of claim 1, wherein the navigation circuit is configured to receive movement information of the user,
    wherein, to determine the estimated transit time for the at least one pedestrian walking segment, the navigation circuit is configured to use the received movement information of the user, and
    wherein the system comprises a user interface configured to provide an indication of the determined estimated wait time to the user.

3. The system of claim 2, wherein the movement information of the user comprises a location and speed of the user and the real-time location and movement information of the transportation resource comprises a location, direction, and speed of the transportation resource.

4. The system of claim 2, wherein the navigation circuit is configured to provide route guidance information to the user of the pedestrian route, the route guidance comprising an indication of the determined estimated wait time.

5. The system of claim 1, comprising a control circuit configured to provide an instruction to control the transportation resource using the determined estimated transit time for the at least one pedestrian walking segment, wherein the navigation circuit is configured update the estimated wait time for the transportation resource based on the provided instruction to control the transportation resource.

6. The system of claim 1, wherein, to segment the pedestrian route, the segment circuit is configured to segment the pedestrian route into the at least one pedestrian walking segment and a first transportation resource segment,
wherein the pedestrian route comprises the at least one pedestrian walking segment and the first transportation resource segment,
wherein the navigation circuit is configured to determine an estimated transit time of the first transportation resource segment, and
wherein the estimated transit time for the pedestrian route comprises the determined estimated transit time for the at least one pedestrian walking segment, the determined estimated wait time for the first transportation resource, and the determined estimated transit time of the first transportation resource segment.

7. The system of claim 1, wherein the transportation resource comprises a building transportation resource, wherein the building transportation resource comprises an elevator.

8. The system of claim 1, wherein the transportation resource comprises a building transportation resource, wherein the building transportation resource comprises an escalator.

9. The system of claim 1, wherein the navigation circuit is configured to receive average pedestrian transit information about the at least one pedestrian walking segment, and to determine an indication of congestion for the at least one pedestrian walking segment using the received average pedestrian transit information.

10. The system of claim 9, wherein the navigation circuit is configured to receive movement information of the user and to determine the indication of congestion for the at least one pedestrian walking segment using a difference between the received average pedestrian transit information and the received movement information of the user.

11. The system of claim 10, wherein the received average pedestrian transit information comprises an average walking speed of a plurality of users for the at least one pedestrian walking segment, and
wherein the movement information of the user comprises a speed of movement by the user.

12. The system of claim 9, comprising a control circuit configured to provide an instruction to control the first transportation resource using the determined indication of congestion.

13. The system of claim 9, wherein the navigation circuit is configured to adjust the determined estimated transit time for the pedestrian using the determined indication of congestion for the at least one pedestrian walking segment.

14. The system of claim 9, wherein the navigation circuit is configured to adjust the determined estimated wait time for the transportation resource using the determined indication of congestion for the at least one pedestrian walking segment.

15. The system of claim 9, wherein the navigation circuit is configured to adjust the determined estimated transit time for the pedestrian route using the determined indication of congestion for the at least one pedestrian walking segment.

16. A system, comprising:
means for determining, using a navigation circuit, an estimated transit time for a pedestrian route for a user between an origin and a destination; and
means for receiving location information of a first transportation resource with respect to the pedestrian route; and
means for segmenting, using a segment circuit, the pedestrian route into at least one pedestrian walking segment comprising a first pedestrian walking segment preceding the first transportation resource using the location information of the first transportation resource,
wherein the means for determining the estimated transit time comprises:
means for determining an estimated transit time for a first pedestrian walking segment based on information about the user and the first pedestrian walking segment of the pedestrian route;
means for determining an estimated wait time for the first transportation resource to meet the user using real-time location and movement information of the first transportation resource and the determined estimated transit time for the first pedestrian walking segment; and
means for determining an estimated transit time for the first transportation resource to transport the user,
wherein the means for determining the estimated transit time includes as a function of the determined estimated transit time for the first pedestrian walking segment, the determined estimated wait time for the first transportation resource, and the determined estimated transit time for the first transportation resource.

17. The system of claim 16, comprising:
means for receiving movement information of the user,
wherein means for determining the estimated transit time for the first pedestrian walking segment comprises means for determining the estimated transit time for the first pedestrian walking segment using the received movement information of the user, and
wherein the system comprises means for providing, using a user interface, an indication of the determined estimated wait time to the user.

18. The system of claim 17, wherein the movement information of the user comprises a location and speed of the user and the real-time location and movement information of the first transportation resource comprises a location, direction, and speed of the first transportation resource.

19. The system of claim 17, comprising:
means for providing route guidance information to the user of the pedestrian route, the route guidance comprising an indication of the determined estimated wait time.

20. The system of claim 16, comprising:
means for controlling the first transportation resource using the determined estimated transit time for the first pedestrian walking segment, including to provide an instruction to control the first transportation resource; and
means for updating the estimated wait time for the first transportation resource based on the provided instruction to control the first transportation resource.

21. The system of claim 16, wherein means for segmenting the pedestrian route comprises means for segmenting the pedestrian route into the at least one pedestrian walking segment and a first transportation resource segment,
wherein the pedestrian route comprises the at least one pedestrian walking segment and the first transportation resource segment,
wherein the system comprises means for determining an estimated transit time of the first transportation resource segment, and wherein means for determining the estimated transit time for the pedestrian route comprises:
means for determining the estimated transit time for the first pedestrian walking segment;
means for determining the estimated wait time for the first transportation resource; and
means for determining the estimated transit time of the first transportation resource segment.

22. The system of claim 16, comprising:
means for receiving average pedestrian transit information about the at least one pedestrian walking segment, and
means for determining an indication of congestion for the at least one pedestrian walking segment using the received average pedestrian transit information.

23. The system of claim 22, comprising:
means for receiving movement information of the user;
means for determining the indication of congestion for the at least one pedestrian walking segment using a difference between the received average pedestrian transit information and the received movement information of the user.

24. The system of claim 23, wherein the received average pedestrian transit information comprises an average walking speed of a plurality of users for the at least one pedestrian walking segment, and
wherein the movement information of the user comprises a speed of the user.

25. At least one non-transitory machine-readable medium including instructions for pedestrian traffic management, the instructions, when executed by a hardware circuitry, cause the hardware circuitry to perform operations comprising:
determining an estimated transit time for a pedestrian route for a user between an origin and a destination; and
receiving location information of a first transportation resource with respect to the pedestrian route, information about the user, and real-time location and movement information of the first transportation resource; and
segmenting the pedestrian route into at least one pedestrian walking segment comprising a first pedestrian walking segment preceding the first transportation resource using the location information of the first transportation resource,
wherein determining the estimated transit time comprises:
determining an estimated transit time for the first pedestrian walking segment based on the information about the user and the first segmented pedestrian walking segment;
determining an estimated wait time for the first transportation resource to arrive at the user using the received real-time location and movement information of the first transportation resource and the determined estimated transit time for the first pedestrian walking segment; and
determining an estimated transit time for the first transportation resource to transport the user, and
wherein determining the estimated transit time for the pedestrian route includes as a function of the determined estimated transit time for the first pedestrian walking segment, the determined estimated wait time for the first transportation resource, and the determined estimated transit time for the first transportation resource.

* * * * *